March 12, 1935. H. RABEZZANA 1,993,896
SPARK PLUG GAP GAUGE
Filed June 16, 1934
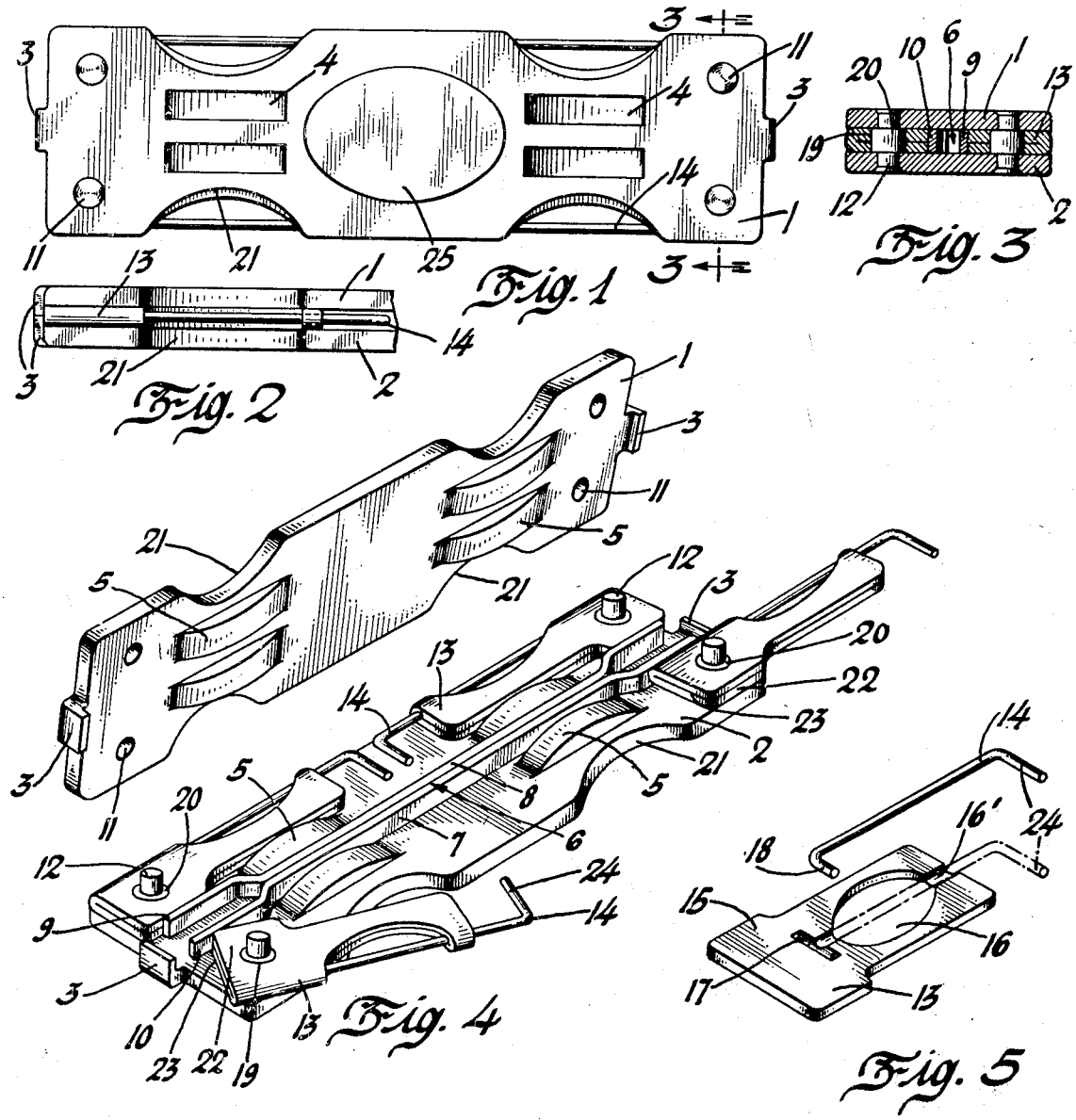
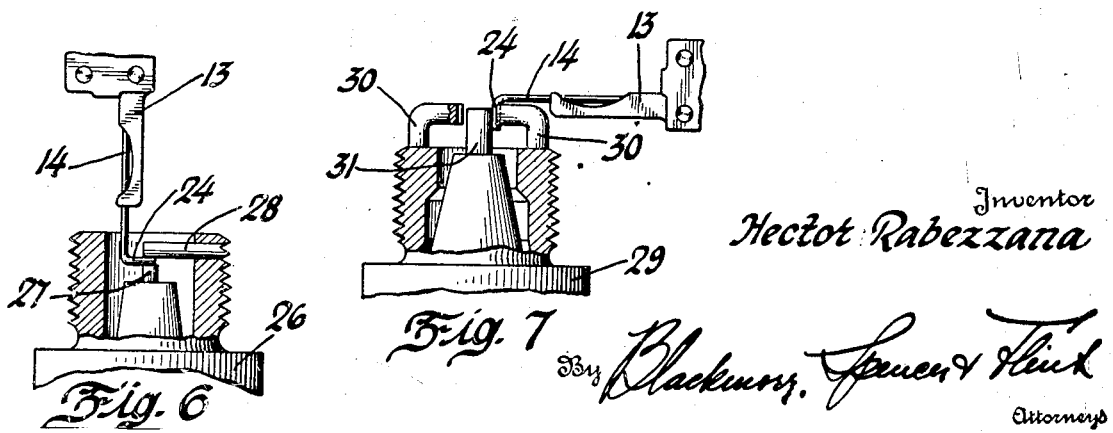
Inventor
Hector Rabezzana
By Blackmore, Spencer & Flink
Attorneys Patented Mar. 12, 1935

1,993,896

UNITED STATES PATENT OFFICE 1,993,896

SPARK PLUG GAP GAUGE

Hector Rabezzana, Flint, Mich., assignor to General Motors Corporation, Detroit, Mich., a corporation of Delaware Application June 16, 1934, Serial No. 730,927

4 Claims. (Cl. 33—168)

This invention relates broadly to gauges for measuring comparatively small spaces between two parts of apparatus and more specifically to gauges for use in measuring the gap between the two electrodes of a spark plug.

As is well known in spark plug construction many of the gaps between the two electrodes are up within the end portion, the ground wire lying horizontally below the center electrode which makes the gap vertical. It can thus be seen that the gauge must go up inside the small end opening and then turn at right angles to measure the gap. The present tendency in spark plug design is toward smaller plugs which makes the end opening smaller.

In other types of spark plugs the central electrode extends beyond the end of the threaded part of the shell and ground wires extend from the side toward it, the gap in this case being horizontal. The ends of the ground wires are concave to conform to the shape of the central electrode.

In either of the above types the flat thickness gauge which is well known cannot be used because in the first instance it cannot be placed in the end as most of them are too wide and even if it is sufficiently narrow to enter the end it cannot be bent at right angles to go into and measure the gap. In the second type the flat gauge does not give an accurate reading of the gap because the ground wire is concave and of the same radius as the central electrode which is too small a radius in which to bend the flat gauge. The flat gauge, if placed in this gap, will touch the edges of the ground wire and a point on the periphery of the central electrode which will give a wider setting than desired.

It is therefore the object of this invention to provide a gauge that will easily and accurately measure this type of gap and also which will be practical and economical of manufacture.

With this and other objects in view, the invention will be better understood by references to the description in the following specification and claims and as illustrated in the drawing in which:

Figure 1 is a top plan view of my gauge.

Figure 2 is a partial side elevation, one end being broken away.

Figure 3 is a sectional view taken on the line 3—3 of Figure 1.

Figure 4 is a disassembled perspective view of the device showing the top section of the gauge raised to expose the inside construction.

Figure 5 is a perspective detail showing the gauge wire positioned within its supporting member before the latter is bent upon itself.

Figure 6 is a view showing the application of my device to one type of spark plug, parts of the latter being broken away.

Figure 7 is a view showing the application of my device to another type of spark plug, also with parts broken away.

The main frame of the device is formed of two substantially rectangular plates 1 and 2 which are identical. In the center, at each end of each plate is a lug 3 extending at right angles to the plane of the plate which act as spacers to hold the two plates apart. A short distance on each side of the longitudinal center line and approximately half way from the center of the plate to the end are a series of four rounded depressions 4 in the top of the plate that are pressed in and cause four rounded raised portions 5 on the opposite face. These raised portions are pressed out to one half the height of the spring assembly 6 so that when the two plates are placed face to face the eight raised portions 5 will enclose and support the spring assembly. The spring assembly is formed of two long rods 7 and 8 rectangular in cross section which are slightly shorter than the main plates and are supported, as above mentioned, between the raised portions 5. The end portions between the raised portions 5 and the end of the plate are oppositely offset, as at 9 and 10, to form a substantially U-shaped opening. This will allow the two arms 9 and 10 to spring inwardly.

In each corner of the main plates is drilled a hole 11 for the insertion of rivets 12 to secure the two plates together. These rivets also secure to the plates pivoted members 13 which hold the actual gauge wires 14. The members 13 are formed of flat roughly rectangular plates, as best shown in Figure 5, one end portion being slightly wider than the rest, as shown at 15. Toward the opposite end is formed an elliptical hole 16. The member is grooved, as at 16', upon its longitudinal axis across the hole 16 up to the widened end portion where it meets a short cross groove 17. The gauge wire has a short right angle bend upon the inner end which fits in this latter groove 17. After the gauge wire is laid in the groove the member 13 is bent about its longitudinal axis which secures the wire within and the angled end 18 prevents it from turning.

Through the widened end portion is then drilled a hole 19 in which the rivet is inserted. The mid portion 20 of the rivet is larger than the two end portions and this engages the hole 19 in the wire holding member. As the member 13 is doubled upon itself, the hole 16 becomes a C-shaped opening with the wire projecting across its edge. Directly above and below this opening the two plates are cut away, as shown at 21. This allows the gauges to be gripped and pulled out from inside the casing.

When the members 13 have been placed upon the rivets and the rivets inserted in the holes in the plates, the side and rear faces 22 and 23 of the edges will contact with the spring arms 9 and 10 which will keep them in a set position, for in order to turn, the member will press the spring in, as a corner contacts and cams over the spring surface. The narrower end of member 13 fits around the raised portion 5. The outer end of wire 14 is bent at right angles, as shown at 24, which projects inwardly toward the center of the assembly when it is in its folded away position.

On the top of the assembly is a raised portion 25 for the application of insignia of any desired kind.

The assembly of the unit is as follows: The members 13 are first stamped out flat and the wires placed upon them in the groove, they are then folded upon themselves and the end portion drilled for the rivet which is later pressed into the hole, the two main plates are then stamped out and the two spring portions placed between the raised humps 5, the wire gauge assemblies are then placed upon one plate in contact with the springs and the other plate placed thereon and the whole riveted together.

Ordinarily the gauges are all folded into the casing so that the whole is merely a small rectangular member, but if it is desired to use one of the gauges, the wire 14 of that gauge is taken hold of and pulled laterally from the casing. This bends the spring 9 or 10 which comes back to its normal position as the base 23 becomes parallel to the spring and holds the gauge at right angles to the case. If it is desired to turn it 90° farther the same process is repeated.

It is to be understood, of course, that while all the gauge wires have been given the same reference character, namely 14, that they are each different in diametrical size from the others. On the top plate above each gauge may be stamped the size of the gauge for reference purposes.

In Figure 6 is illustrated the use of the gauge in a spark plug 26 which has the central electrode 27 sunken in the end with the ground wire 28 horizontally above it and shows how the tip 24 can be inserted in the gap and give an accurate measurement thereof.

In Figure 7 is illustrated the application of the device to a spark plug 29 which has the ground wire 30 extending horizontally toward the central electrode 31, the end of the ground wire being concave.

It can therefore be seen from the foregoing that I have provided a practical and accurate gauge for use where space is limited and for special problems, such as spark plug gaps.

I claim:

1. A gauge for spark plugs comprising a plurality of wire gauges of different sizes pivotally secured in the corners of a rectangular casing, openings in the casing into which they may be folded when not in use, the ends of the wires being bent inwardly in the plane of the casing at right angles to the main portion of the wire to facilitate use in limited space and allow folding.

2. A gauge for spark plugs comprising a plurality of wire gauges of different sizes pivotally secured in the corners of a rectangular casing, resilient means supported by the casing bearing against the securing means to hold the gauges in certain positions, openings in the casing into which the gauges may be folded when not in use, the ends of the wires being bent at right angles to the main portion of the wire inwardly toward the casing to facilitate use in a limited space and fold inwardly also.

3. A gauge comprising a two-piece casing, having two flat rectangular plates placed face to face, gauge wire supporting means carried between the two plates at each corner thereof, resilient means bearing against a flat face of the gauge wire supporting means to keep it stationary in a certain position, said resilient means secured to the casing, a wire gauge supported in each gauge wire supporting means and projecting therefrom, the end portion being bent at right angles to the main wire shaft to facilitate use in limited space.

4. A gauge comprising a flat rectangular casing having a top and bottom plate spaced from each other, means for supporting a spring through the center on the longitudinal axis of the casing, pivotal means attached between the two plates in each corner of the casing, the base of each pivotal means being square and pressing against the spring so that when a flat surface is in contact with the spring the member will be held in a given position, wires of different diameters secured in each pivotal member, the end of the wires being bent inwardly at right angles to the main wire shaft, whereby the gauge members may be folded within the casing or pulled out to desired positions, the end portion being bent facilitating access to small places.

HECTOR RABEZZANA.